(12) United States Patent
Herschell et al.

(10) Patent No.: US 7,696,862 B2
(45) Date of Patent: Apr. 13, 2010

(54) TRACTOR-TRAILER TETHER SENSOR

(76) Inventors: Frank Herschell, 550 Webb Drive, Suite 818, Mississauga, Ontario (CA) L5B 3Y4; Ashok Verma, 2 Aristocrat Road, Brampton, Ontario (CA) L6P 1W9; Christhoper Panczuk, 70 Juneau Road, P.O. Box 766, Victoria Harbour, Ontario (CA) L0K 2A0; Nick Cirella, 5875 Hwy 7, Suite 200, Woodbridge, Ontario (CA) L4L 1T9

( * ) Notice: Subject to any disclaimer, the term of this patent is extended or adjusted under 35 U.S.C. 154(b) by 292 days.

(21) Appl. No.: 11/773,177

(22) Filed: Jul. 3, 2007

(65) Prior Publication Data

US 2008/0012695 A1    Jan. 17, 2008

(51) Int. Cl.
G08B 21/00 (2006.01)

(52) U.S. Cl. .......... 340/431; 340/989; 340/540; 340/541; 340/626; 340/577; 340/635; 340/636.1; 340/825.36; 340/825.49

(58) Field of Classification Search .......... 340/989, 340/540, 541, 577, 626, 635, 636.1, 636.15, 340/7.37, 825.36, 825.49, 992; 342/457; 701/207

See application file for complete search history.

(56) References Cited

U.S. PATENT DOCUMENTS

| | | | |
|---|---|---|---|
| 5,025,253 A | 6/1991 | DiLullo et al. | |
| 5,240,311 A | 8/1993 | Bunker | |
| 5,442,810 A | 8/1995 | Jenquin | |
| 5,854,517 A | 12/1998 | Hines | |
| 5,917,433 A * | 6/1999 | Keillor et al. | 340/989 |
| 5,917,632 A | 6/1999 | Lesesky | |
| 5,999,091 A | 12/1999 | Wortham | |
| 6,111,524 A | 8/2000 | Lesesky et al. | |
| 6,466,028 B1 | 10/2002 | Coppinger et al. | |
| 6,489,496 B2 | 12/2002 | Barnhorst et al. | |
| 6,501,376 B2 | 12/2002 | Dieckmann et al. | |
| 6,582,033 B2 | 6/2003 | Lesesky et al. | |
| 6,687,609 B2 | 2/2004 | Hsiao et al. | |
| 6,705,478 B1 | 3/2004 | Engle | |
| 6,799,814 B2 | 10/2004 | Lesesky et al. | |
| 6,982,656 B1 * | 1/2006 | Coppinger et al. | 340/988 |

(Continued)

FOREIGN PATENT DOCUMENTS

CA    2415892    1/2002

*Primary Examiner*—Daryl Pope

(57) ABSTRACT

An apparatus, system and method for monitoring and reporting the tethered/untethered status of a mobile asset are described. An asset tracking device comprises a sensor and circuit that detects whether a physical connection exists between a tractor portion and a trailer portion of a tractor/trailer vehicle. The physical connection is detected through the connection of an air hose coupling (or glad hand) at the trailer front wall. The sensor is continuously monitored by the sensor circuit and when a change is detected, the circuit sends a signal that turns on the power to the rest of the system. This enables the system to run in a very low power mode for extended periods of time. The sensor, which is located on the air hose (glad hand) coupling, senses the presence (or non-presence) of a tractor attached to the trailer and sends a trigger signal to turn on the power to the rest of the system, enabling the system to operate for extended periods of time on battery power. The asset tracking device and system also includes a processor, a location determining device for determining the geographic location of the mobile asset, and a transceiver for transmitting and receiving the tethered/untethered status of the mobile asset.

20 Claims, 12 Drawing Sheets

U.S. PATENT DOCUMENTS

2003/0233189 A1  12/2003  Hsiao et al.
2006/0017551 A1   1/2006  Neher et al.
2006/0043731 A1   3/2006  Sommerfeld

* cited by examiner

TRACTOR-TRAILER TETHER SENSOR

FIELD OF THE INVENTION

The present invention relates to apparatus, systems and methods for monitoring mobile assets. The present invention more particularly relates to apparatus, systems and methods for monitoring the tethered or untethered status of trailers for tractor-trailer vehicles.

BACKGROUND OF THE INVENTION

Each day, thousands of tractor-trailer trucks travel the highways transporting cargo from one location to another. Trucking companies, who are responsible for making sure the cargo reaches its destination on time, need the ability to track the location of the tractor-trailer throughout its journey. The trucking companies need to be able to monitor when and where a trailer is hooked up (tethered) and dropped off (untethered).

Prior asset tracking systems, which have depended primarily on the electrical cable coupling (e.g., 7-pin) to determine the tethered/untethered status have been expensive, complex, and in many situations ineffective.

Other prior art tracking systems used connectors and glad hand devices that incorporated conductors along the air brake hose line as outlined in U.S. Pat. No. 5,442,810.

Prior art solutions also often rely on a 7-pin power connector (J560) to be connected in order to sense a tethered or untethered event. This results in not all tethered/untethered events being registered. For example, many times a trailer is "shunted" from one location to another within the company yard without connecting the 7-pin power connector.

What is needed, therefore, is a new and innovative approach to monitoring and reporting the status of mobile assets, such as trailers and their valuable cargo.

SUMMARY OF THE INVENTION

The present invention provides an apparatus and method for monitoring and reporting the tethered/untethered status of a mobile asset.

In an aspect of the present invention, an asset tracking device comprises of a sensor and circuit that detects whether a physical connection exists between a tractor portion and a trailer portion of a tractor/trailer vehicle.

According to one particular embodiment of the present invention, the physical connection between the tractor and the trailer is detected through the connection of an air hose coupling, or glad hand, at a front wall of the trailer. A sensor is continuously monitored by a sensor circuit and when a change is detected, the circuit sends a signal that turns on power to the rest of the system. Advantageously, this enables the system to run in a very low power mode for extended periods of time.

According to this embodiment, the sensor, which is located on the air hose or glad hand coupling, performs two functions. First, the sensor senses the presence (or non-presence) of a tractor attached to the trailer. Second, the sensor sends a trigger signal that turns on the power to the rest of the system, enabling the system to operate for extended periods of time on battery power.

In another aspect of the present invention, the asset tracking device comprises a processor, a location determining device for determining the geographic location of the mobile asset, and a transceiver for transmitting and receiving the tethered/untethered status of the mobile asset.

Advantageously, the apparatus, system and method of the present invention can be implemented in connection with any tractor, which is convenient and less expensive when compared to existing solutions. The present invention also does not rely on the 7-pin power connector, and is therefore more reliable and effective at sensing both tethered and untethered events.

BRIEF DESCRIPTION OF THE DRAWINGS

A detailed description of the preferred embodiments is provided herein below by way of example only and with reference to the following drawings, in which.

Figure 1:
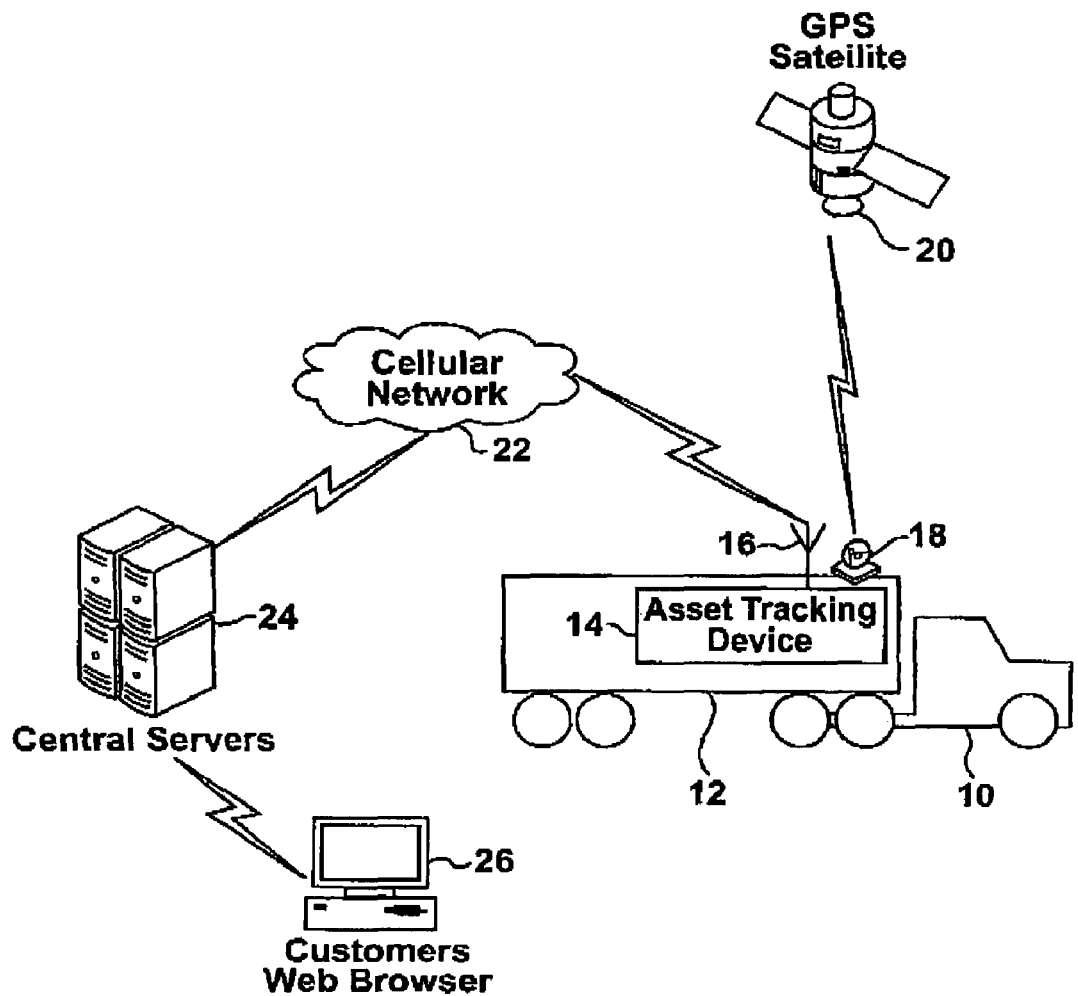
FIG. 1 is a functional block diagram of a system for monitoring and reporting the status of a mobile asset according to a preferred embodiment of the invention.
Figure 2:
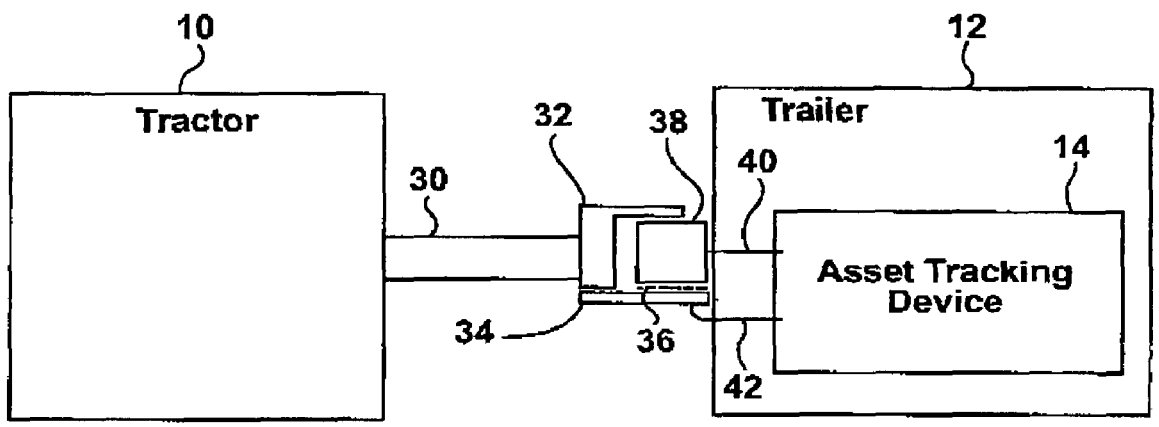
FIG. 2 is a functional block diagram of an asset tracking device with a preferred embodiment of the tether sensor.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

Illustrated in FIG. 1 is a system for detecting whether a first vehicle portion, such as a tractor 10, is connected to a second vehicle portion, such as a trailer 12, and for transmitting status signals indicative of the connect/disconnect status.

Figure 10:
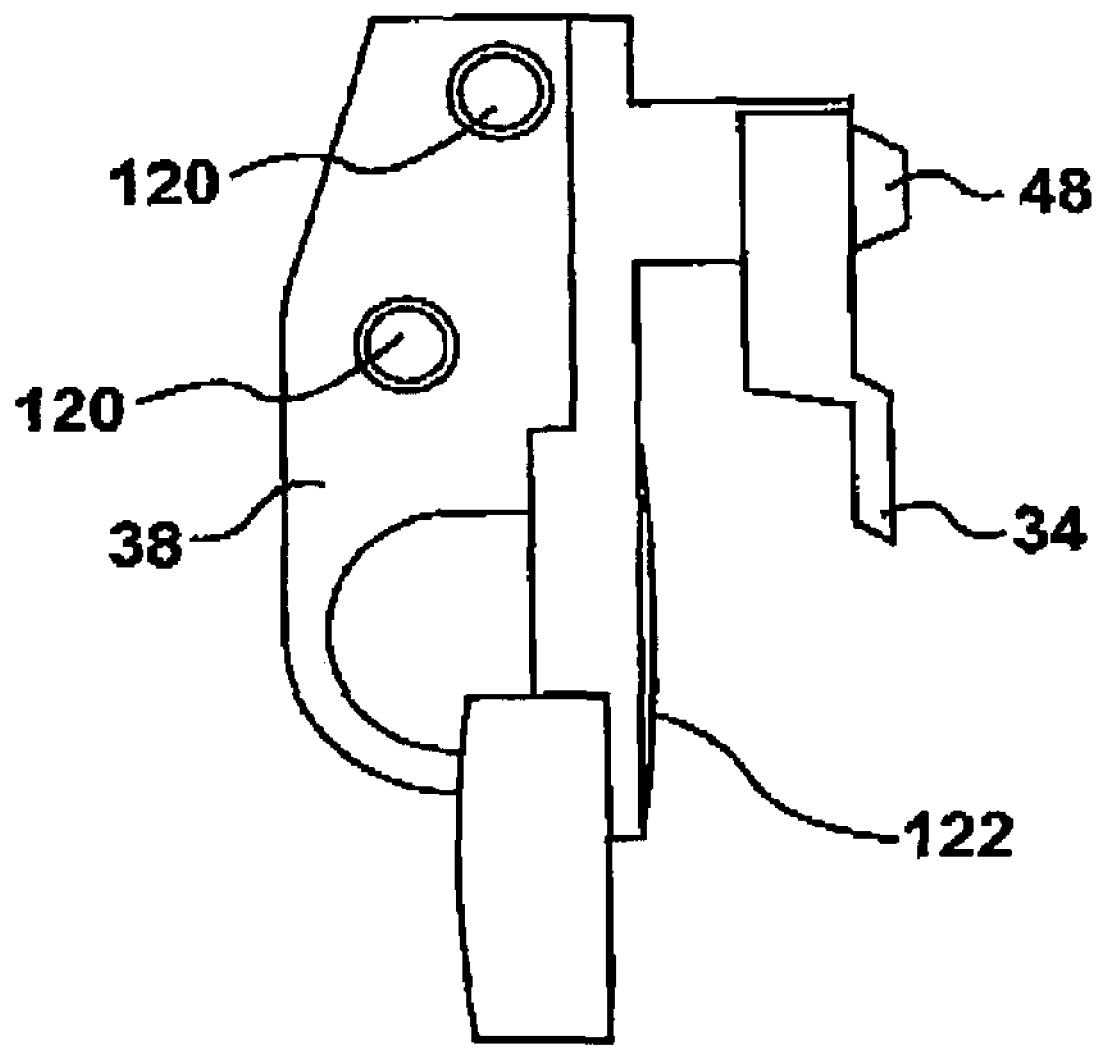
FIG. 10 is a top plan view of a glad hand pneumatic coupler.

A typical example of a glad hand pneumatic coupler 2 is illustrated in FIG. 10, which comprises a trailer side glad hand coupler body 38 that can be mounted to the front of a trailer by fasteners such as bolts 120, a trailer side glad hand bracket 34 held in place by fasteners, such as bolts 48 and an air inlet or opening 122. Glad hand pneumatic couplers are well known in the industry and have been specified by the Society of Automotive Engineering ("SAE") according to the standard number J318.

Figure 3:
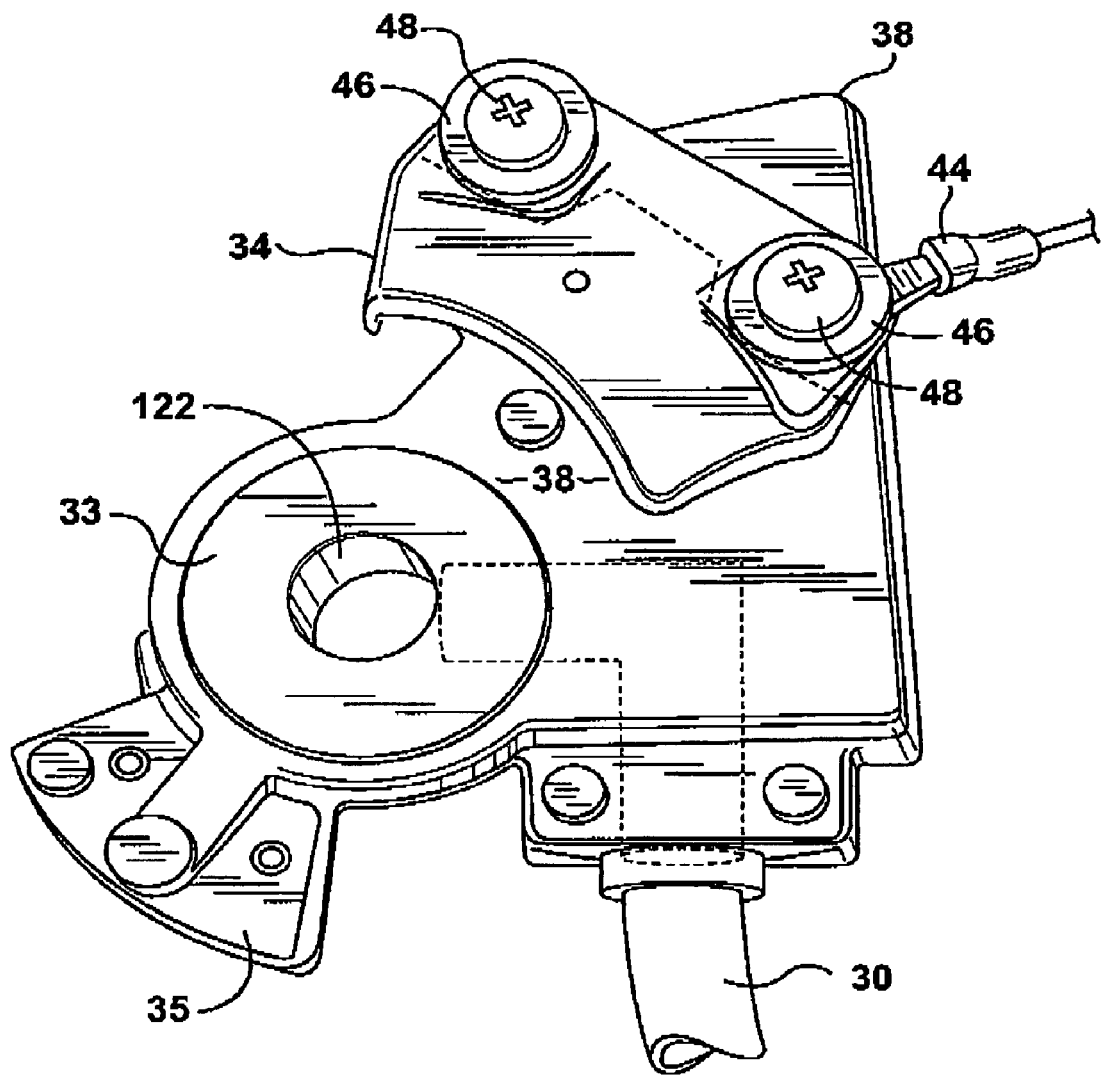
FIG. 3 is a front view pictorial diagram of the trailer side glad hand coupling for mounting on the trailer portion of the tractor-trailer.
Figure 4:
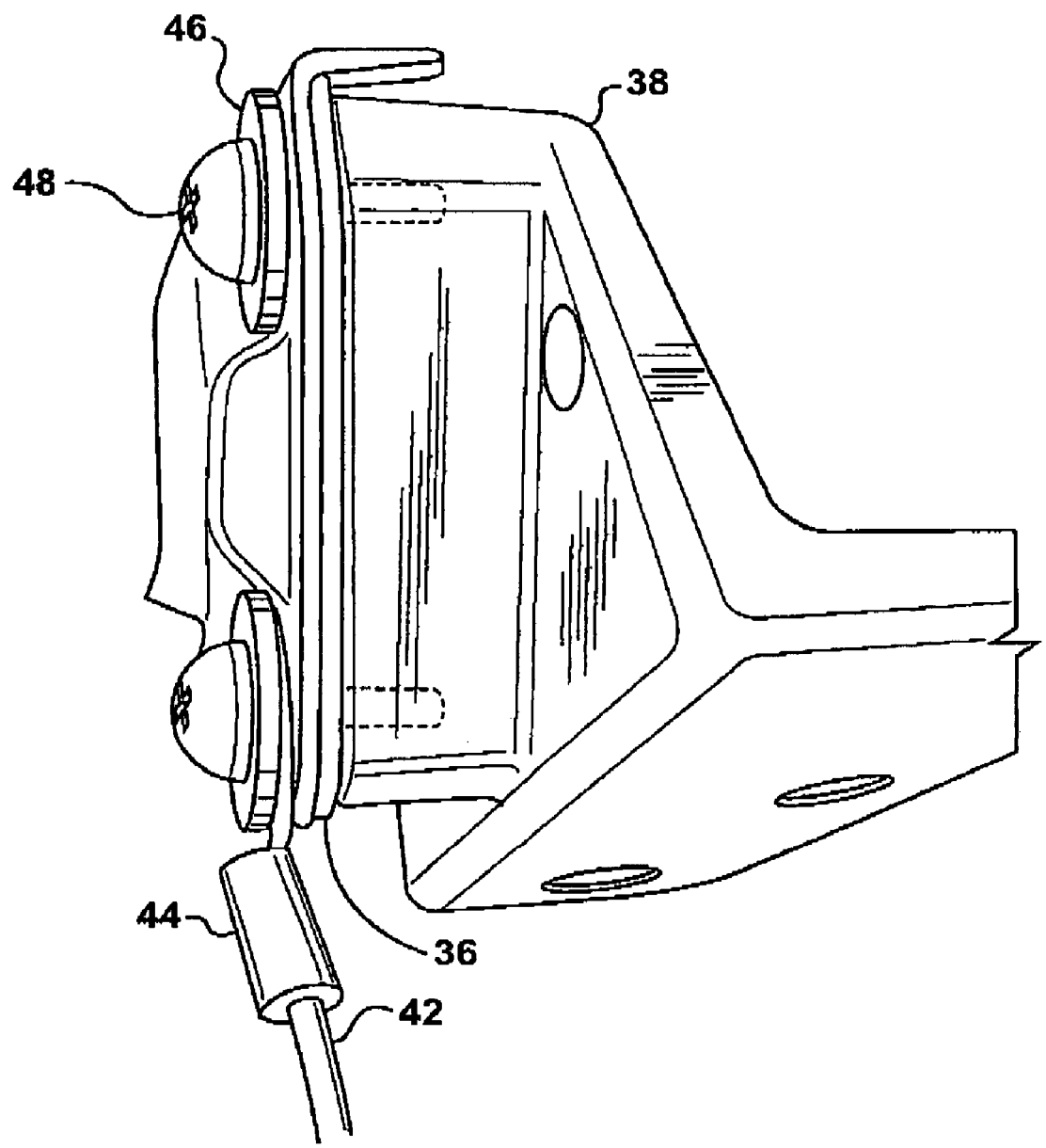
FIG. 4 is a side view pictorial diagram of the trailer side glad hand coupling for mounting on the trailer portion of the tractor-trailer.
Figure 5:
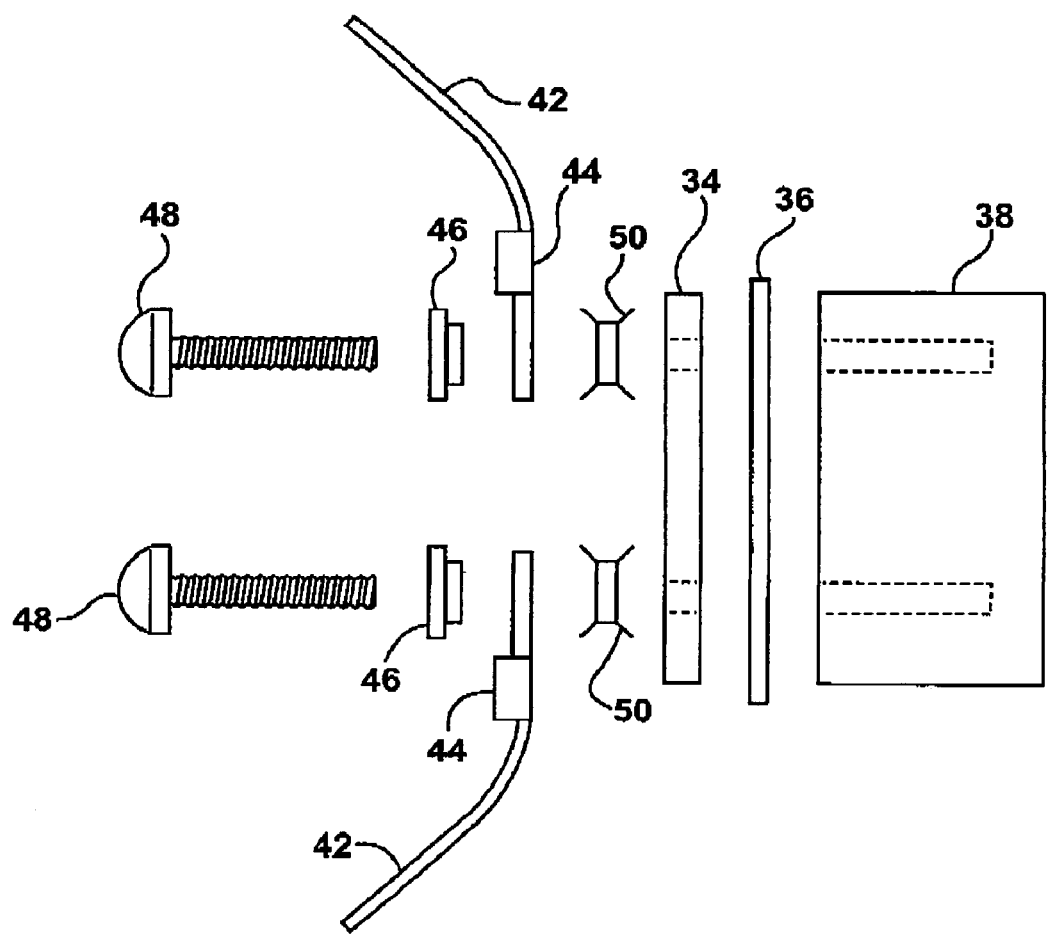
FIG. 5 is an exploded view diagram of the trailer side glad hand coupling for mounting on the trailer portion of the tractor-trailer.

A glad hand assembly in accordance with the present invention is shown in FIGS. 3, 4, and 5 and comprises a trailer side glad hand coupler body 38, a trailer side glad hand bracket 34, a tractor glad hand coupler 32. The bracket 34 is grounded when an air hose 30 is connected to the trailer. The bracket 34 is floating or not grounded when the air hose 30 is disconnected from the trailer 12.

In particular the air hose 30 is functionally connected to the trailer side glad hand or coupler as shown. The air hose line 30 communicates with opening 122. Moreover the coupler 32 has in one embodiment a rubber seal 33 as shown.

The tractor side also has a glad hand or coupler 32 which is a mirror image of FIG. 3. The trailer coupler 38 engages the tractor coupler 32 where the lug 35 of the trailer glad hand 38 is received between the space between the bracket 34 and body 38 of the tractor coupler 32 and the lug 35 of the tractor glad hand or coupler 32 is received between the space between the bracket 34 and body 38 of the trailer coupler 38. Once coupled the hoses 30 between the tractor and trailer line up and are operable.

A switch is formed when the trailer-side glad hand bracket 34 is removed from a standard glad hand assembly and an insulator 36 is placed in between the glad hand bracket 34 and the glad hand coupler body 38. When the tractor glad hand coupler 32 is attached to the trailer glad hand coupler body 38, the glad hand bracket 34 comes into electrical contact with the tractor glad hand coupler 32, which is also electrically in contact with the trailer glad hand coupler body 38, which is electrically grounded. The glad hand bracket 34 is fully insulated from the glad hand trailer side coupler 38 by means of an insulator 36 and two insulating shoulder washers 46. Two insulating shoulder washers 46 are used to ensure that two mounting screws 48, which attach the glad hand bracket 34 to the glad hand coupler body 38, do not facilitate an electrical contact between the glad hand bracket 34 and the glad hand coupler body 38. A sensor terminal 44 is attached to the bracket 34 through an external tooth lock washer 50 to ensure that the sensor terminal 44 makes a good electrical connection to the bracket 34. Sensor wire 42 is crimped and soldered to the sensor terminal 44 and routed to the asset tracking device 14, e.g., through the front wall of the trailer 12.

In one embodiment of the invention the sensor wire 42 is attached to the asset tracking device 14 at node 64. The tether sensor supervisory processor 72 is preferably always on and monitoring the state of sensor wire 42. When the trailer 12 is in an untethered state, the sensor wire 42 voltage rests at around +12 volts. When the trailer 12 is in a tethered state, the sensor wire 42 voltage rests at 0 volts because the bracket 34 is electrically connected to the trailer side glad hand coupler body 38 through the tractor-side glad hand coupler body 32, which is in electrical contact with the trailer-side glad hand coupler body 38. The values referred to above are for illustration purposes and should not be viewed as limiting the invention since other values could be used.

Referring to FIG. 5, note that there are two sensor terminals 44 attached to two sensor wires 42. The two sensor wires 42 are attached to the asset tracking device at nodes 64 and 66. This allows the supervisory processor 72 to monitor both wires. This arrangement allows for the detection of a wire cut event caused accidentally or intentionally, thereby disabling the tether sensing system. In the event that the two wires are not at equal potential, then the supervisory processor 72 will send an alarm signal to the central servers 24 through a communications network, (such as for example a cellular network) 22, which will in turn send email, SMS, or pager alerts to configured users.

Figure 6A:
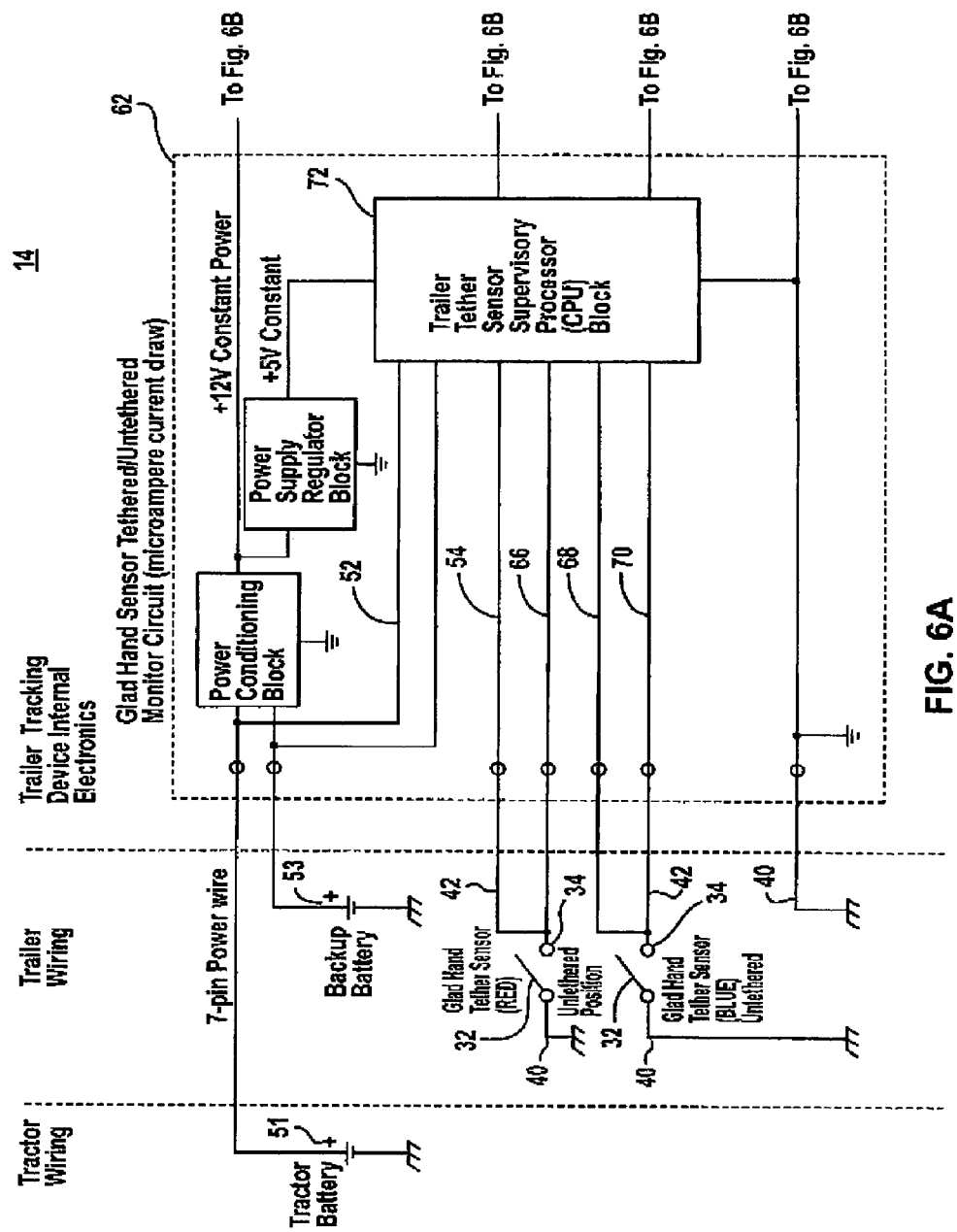
FIG. 6 is a wiring diagram of the asset tracking device according to a preferred embodiment of the present invention.
Figure 6B:
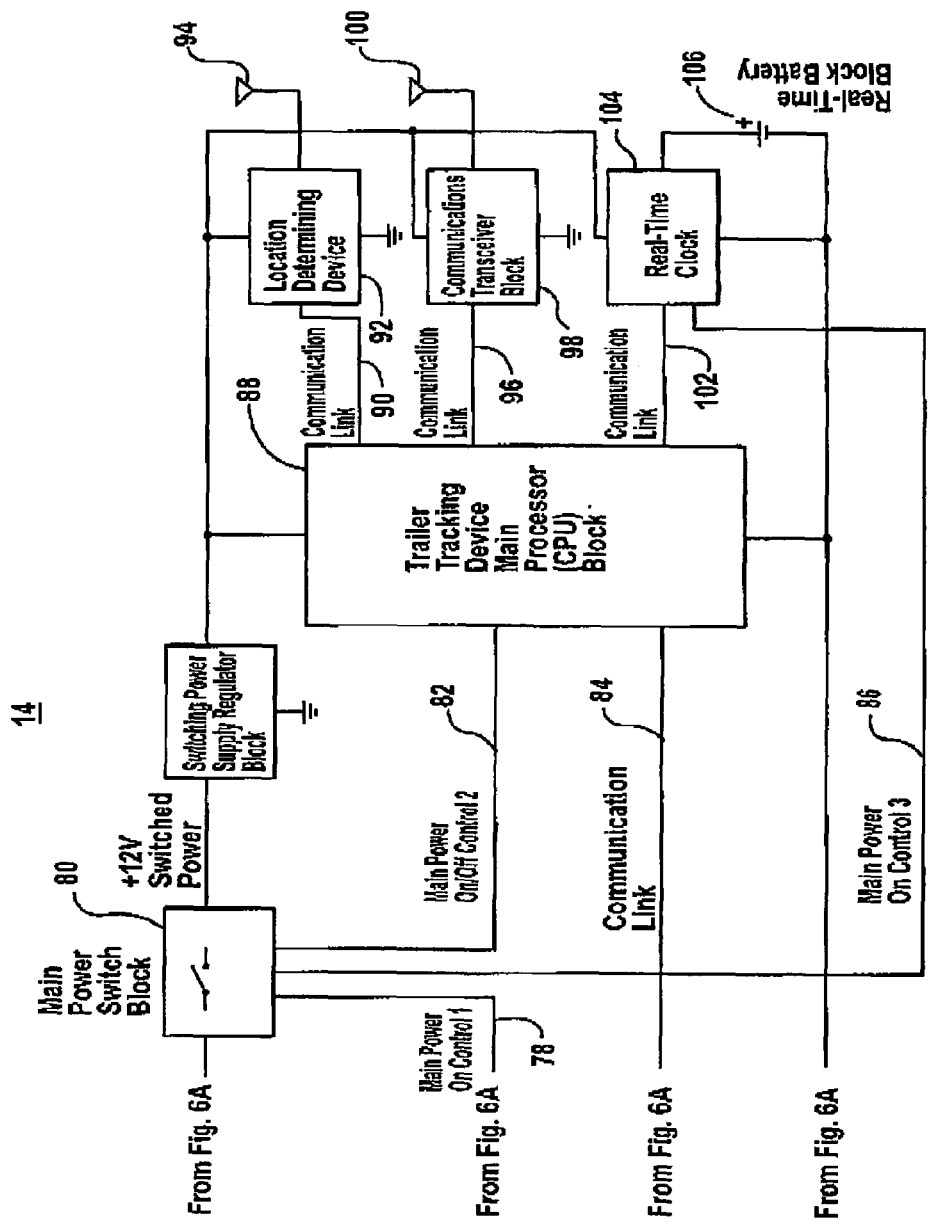

In another embodiment of the invention there are two glad hand couplers 38 for each trailer 12. One coupler is the emergency glad hand identified in FIG. 6 as the "red" glad hand coupling, the other is the service glad hand identified in FIG. 6 as the "blue" glad hand coupling. In a preferred embodiment of the present invention, both glad hand couplers 38 are sensed or monitored by the supervisory processor 72 for increased reliability.

Figure 7:
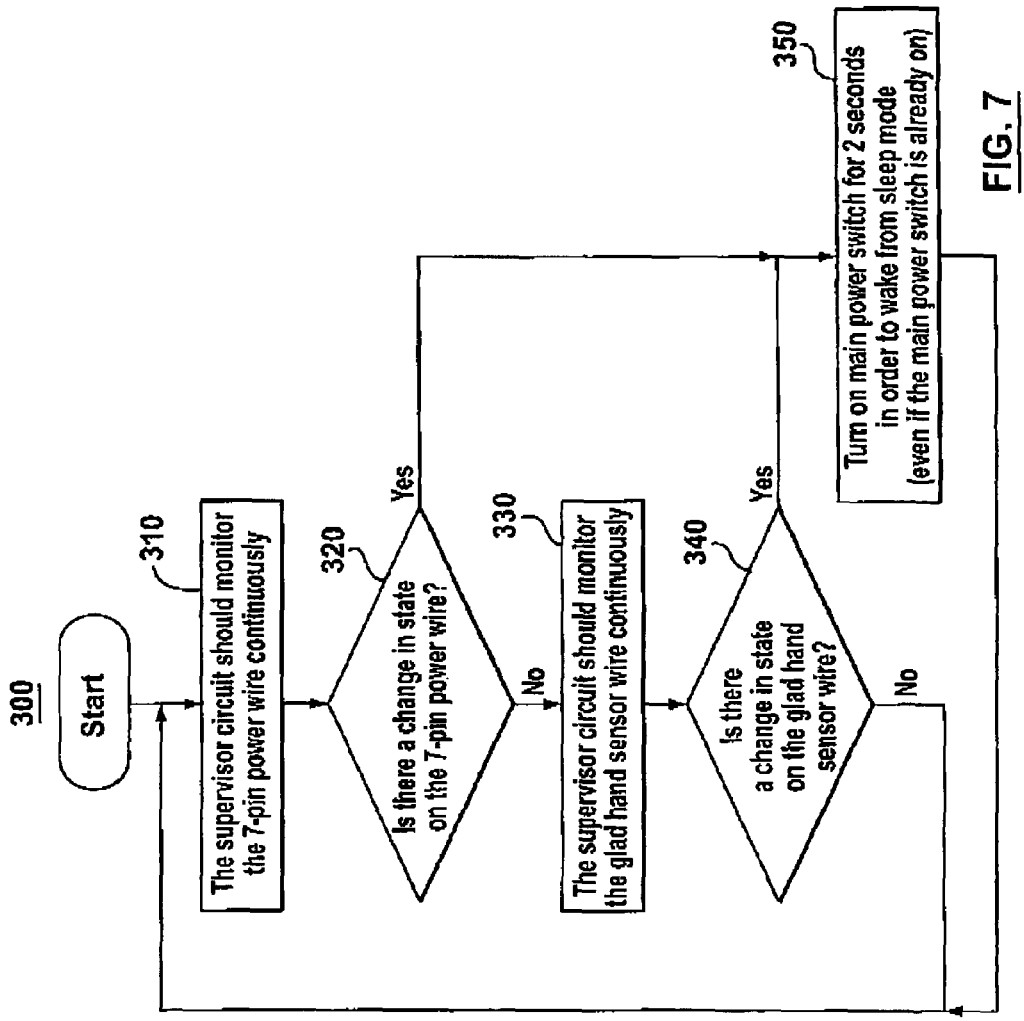
FIGS. 7, 8, and 9 are flowchart diagrams illustrating methods for monitoring and reporting the status of a mobile asset according to preferred embodiments of the present invention.

Referring to FIG. 7 in step 310, the supervisory processor 72 performs the basic duty of sensing the glad hand sensors as well as the 7-pin power wire 52 in step 330. When the supervisory processor detects a change in either the glad hand sensor wire 42 in step 340 or the 7-pin power wire in step 320, it turns on the main power switch 80, for 2 seconds for example. If the main power switch 80 was off previously, then when the main power switch 80 is turned on by the supervisory processor 72, the main processor 88 is turned on. After the main processor 88 is turned on, it will send a command to turn on the main power switch 80 through main power on/off control 2 node, 82. This effectively locks the main power switch 80 in an "ON" state for as long as the main processor 88 commands it to. The main processor 88 can also communicate with the supervisory processor 72 through communication link 84 in order to request the current state of the glad hand sensor wires 42 and 7-pin power wire 52, and send the change in state to the central servers 24.

A real-time clock 104 can be configured through a communication link 102 to turn on the main power switch 80 at a future date and time through the main power ON control line 86 while the main processor 88 is in a sleep mode. This is because the real-time clock 104 contains its own battery 106 that maintains the proper date and time and consumes very little power, enabling the real-time clock 104 to operate for extended periods of time.

The main processor 88 is attached to a location determining device, such as for example a GPS receiver 92 through communication link 90 for the purposes of determining the current geographic location and attaching that location to an event such as a tether event or 7-pin power event and sending that information to the central servers 24.

Figure 8:
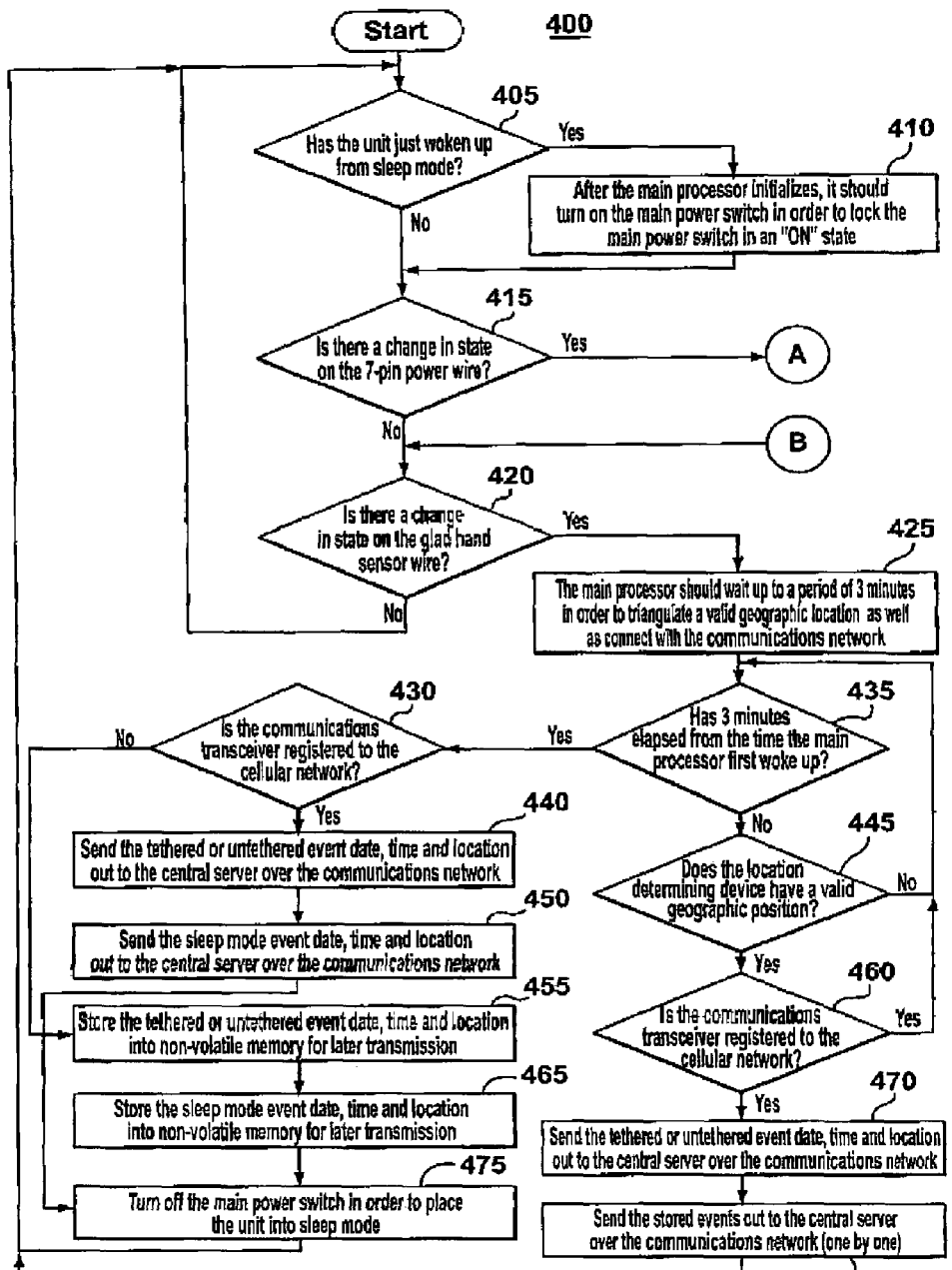

FIG. 8 illustrates a flow diagram method 400 of the main processor 88. After the main, power switch 80 is turned on by the supervisory processor 72 (for example the power switch 80 can be turned on or about 2 seconds), the main processor 88 begins executing at step 405. If the main processor 88 has just woken up from sleep mode, it will activate the main power on/off control line 82 as shown in step 410. Generally speaking, this will be performed in less than 2 seconds thus "latching" the main power switch 80 in an ON state even after the supervisory processor 72 ceases to engage the main power switch 80.

Figure 9:
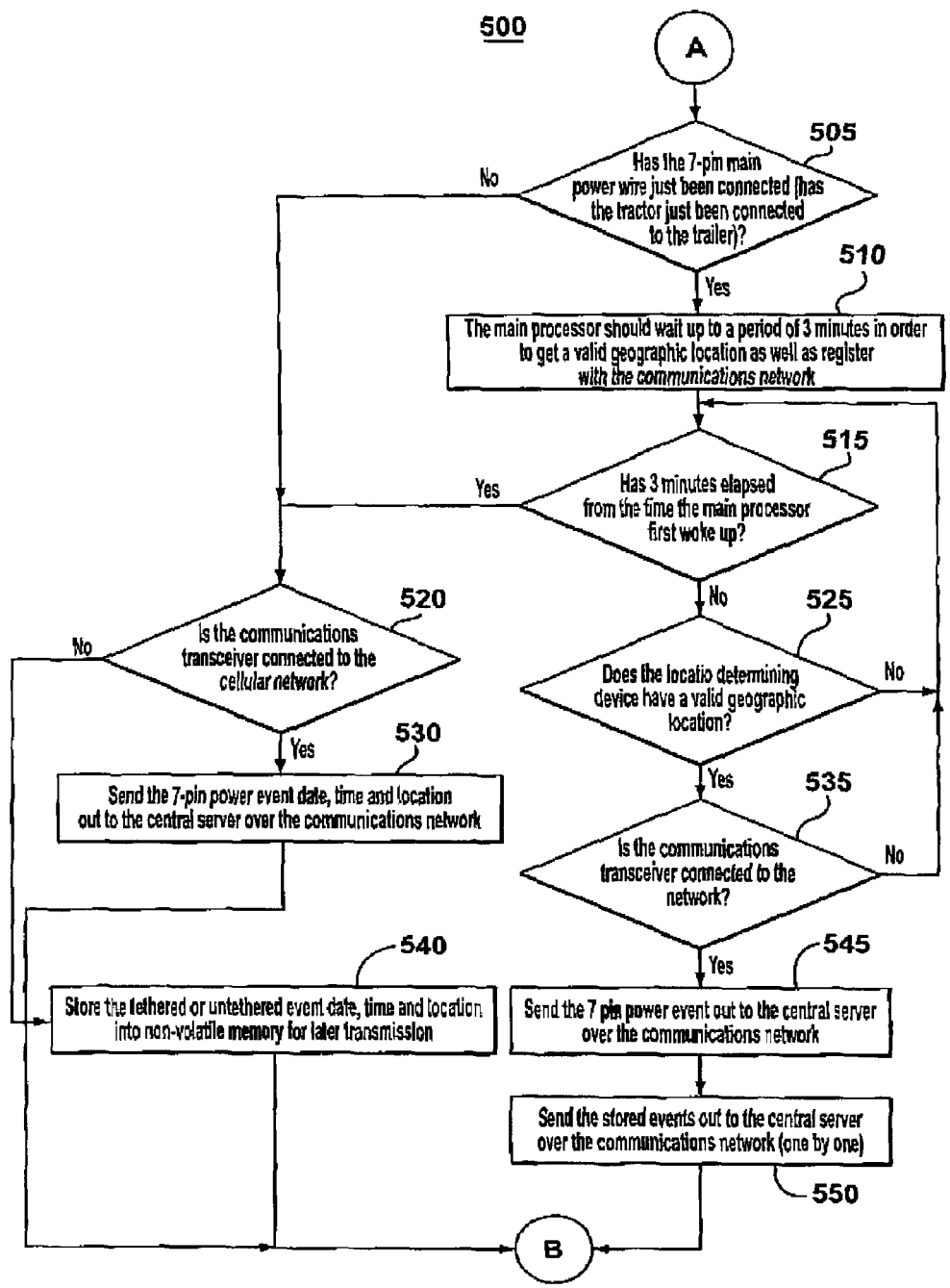

The main processor 88 will then query the state of both the 7-pin power wire in step 415 as well as the tether sensor in step 420 from the supervisory processor 72, through communication link 84. If there is a change in state of the 7-pin power wire 52, then one refers to the flow diagram in FIG. 9. If there is a change in state of the tether sensor wire 42 then a selected timed procedure (for example a 3-minute procedure) is begun as shown in step 425. This period could be changed to any other arbitrary number, but it was chosen to minimize total power consumption when the system is powered by the backup battery only 53. It also allows sufficient time for the location determining device to calculate a valid geographic location and allow the communications transceiver to connect to the network.

If the tractor and trailer are tethered and the 7-pin power wire is connected, then the tractor battery 51 is also available to power the system. In this case, the system does not have to go into a sleep mode in 3 minutes, but can now be left on for several days without danger of draining the tractor battery 51. The main processor 88 keeps track of the time the system is awake as shown in step 435. Once the main processor receives a valid geographic location as in step 445 and has a connection to the network as in step 460, it will send the tethered status to the central servers 24 (step 470) and send any previously stored messages to the central servers as well (step 480). If a connection to the network cannot be made within the 3-minute time interval (step 430), then the main processor 88 will store the tethered status in non-volatile memory contained within the CPU block 88 (step 455) and store a sleep mode event in non-volatile memory as well (step 465). This will ensure that all trailer events will eventually be visible to a user at a customer's web browser 26 at some future point in time when communications become available. Then the main processor 88 will turn off the main power switch 80 to conserve power (step 475).

The main processor 88 is also attached to a communications transceiver 98 through communication link 96, which provides for a means to transmit events and receive commands from the central servers 24.

It should be understood that when the main power switch 80 is on, the asset tracking device 14 draws a considerable amount of power relative to the sleep mode power consumption. When the tractor 10 and trailer 12 and the 7-pin power connector is connected, the asset tracking device 14 derives its power from the tractor battery through the 7-pin power cable. In this mode, since the tractor battery contains large reserves of power compared to the backup battery, the asset tracking device can stay on for a much longer period of time. When the trailer 12 is untethered, power is provided by a backup battery. If the main power switch 80 stays on for extended periods of time with only the backup battery to provide the power, the backup battery would be discharged within hours or days, depending on the size of the backup battery. This is the reason why the main power switch 80 must be turned off to place the asset tracking device in a sleep mode. The asset tracking device 14 is brought out of sleep mode during tethered/untethered events and 7-pin power state changes for small periods of time. It is also brought out of sleep mode by the real time clock if pre-programmed to (possibly once a day or once a week for a short period of time) This allows the system to operate for extended periods of time without the need to recharge the backup battery. The backup battery is recharged only when the trailer 12 is tethered to a tractor 10 and power is present on the 7-pin power wire 52.

Advantageously, the present invention does not require any additional hardware to be installed in the tractor portion of the tractor-trailer. Consequently, any tractor used with the system of the present invention will notify of a tethered or untethered event. Further, prior art solutions generally require extra hardware to reside within the tractor portion, increasing the cost of the overall system. In comparison, the system of the present invention is less expensive.

Practically speaking, many tractors are independently owned and operated, and not all owners/operators are agreeable to having extra hardware installed within their tractor for the purpose of tether sensing and vehicle identification purposes. The system of the present invention avoids this problem entirely since no extra hardware is required within the tractor for the tether sensor to perform properly.

Prior art solutions also often rely on a 7-pin power connector (J560) to be connected in order to sense a tethered or untethered event. This results in not all tethered/untethered events being registered. For example, many times a trailer is "shunted" from one location to another within the company yard without connecting the 7-pin power connector.

However, unlike 7-pin power connectors, air hose couplings (glad hands) must be connected in order for the trailer brakes to be disengaged. If the air hose couplings are not connected, then the trailer physically cannot move because the brakes are locked. This essentially forces the user to connect the air hose couplings together. Since the air hose couplings are now connected, the system of the present invention will sense the change in state and wake up from a sleep mode and send a tethered message to the central monitoring computer 24. Accordingly, the system of the present invention is configured to report all tethered and untethered events along with their newly associated geographic locations in all cases.

As mentioned above, one embodiment of the present invention allows for the detection of a wire cut event. By adding one more wire as described above and attaching the new wire to the bracket on the other screw of the bracket, an electrical circuit can detect whether the two wires are electrically connected together or not (connected together signifies that the system is good, and not connected together signifies that the wire has been cut). This feature is not possible on conventional 7-pin connector tether solutions.

Further, some tractors remove power to all seven pins of the 7-pin power connector (which is connected to the trailer) when the tractor ignition is turned off. Prior art solutions therefore can not distinguish between a tractor with the ignition turned off or a tractor with the 7-pin connector physically disconnected from the trailer. The system of the present invention does not rely on a 7-pin connector and therefore does not suffer from this deficiency.

Stated another way, if the signal from the 7-pin power connector is not on, then if the 7-pin power connector was disconnected, prior art solutions would not be able to detect untethered events. In contrast, the system of the present invention detects untethered events equally as effective as tethered events.

It should also be understood that tractor trailer air hose couplings and 7-pin power connectors experience a wide variety of environmental exposure and abuse, e.g., from snow, slush, mud, dirt, moisture, and operator misuse. Each time an air hose glad hand fitting is connected, to a large extent a good electrical connection is made because of the large forces required to make the physical connection. In some extreme cases, the bracket 34 may become corroded to the point where an electrical connection is not made and the tether sensor fails to create a ground connection when the glad hand fitting is connected. This is why it is recommended that the glad hand bracket 34 be specially processed, where the normal red or blue paint coating be stripped away at the contact area only and plated with a hard conductive material. This would ensure that the electrical contact area maintains a low electrical resistance and not develop any oxides (rust) that would prevent a good electrical connection when the gland hand coupler is connected. As an added safeguard, the trailer tracking device main processor 88 contains additional logic whereby it senses both the condition of the 7-pin power connector, the tether sensor and the trailer speed determined through the location determining device. If a condition exists where a tractor and trailer is tethered and 7-pin power and glad hand couplers are connected, but the tether sensor does not sense a ground connection because of a highly corroded bracket 34, and the location determining device measures a speed of greater than a preset threshold, then the processor 88 would send a special service required message to the central servers 24. This service required message would alert maintenance crews to repair or replace the tether sensor bracket assembly, as soon as possible.

Although the present invention does not rely on the 7-pin power connector for tether sensing, it can be used to enhance reporting capabilities. In other words, the present invention adds one or two more sensor points for tether sensing (one at each air hose coupling). This is in addition to the 7-pin power connector which can also be used for the total tether sensing algorithm for a total of three sensor points. This increases the reliability of the tether sensing solution since it does not rely on a single point of failure. If one or both of the glad hand sensor wires is broken or intentionally cut, then the programming algorithm within the tracking device can detect this since the 7-pin connector will be connected at some point while the glad hand sensors would not (since they are disconnected). The tracking device will then send an alert to the central monitoring station requesting that the sensors be serviced.

For even greater reliability, system of the present invention can implement a sensor in both red and blue glad hand couplings.

Other deficiencies of the prior art are overcome by the present invention. For example, if the tractor portion utilizes modern LED lamps instead of the old style "filament" lamps, then the circuit proposed in prior art solutions (for example see U.S. Pat. No. 6,466,028) will fail to work since modern LED lamps do not present a low circuit resistance when in an "OFF" state. Further, if the turn signal wire that goes to the trailer is not part of the same circuit used for the tractor turn signal lamp, then the circuit proposed in prior art solutions will also fail to work. Not all tractors are wired with the tractor turn signal using the same circuit as the trailer turn signal. This means that some trucks (wired with independent turn signal circuits) would not signal a tethered event at all.

Alternative embodiments of the present invention include, but are not limited to, the implementation of the following tether sensing methods:

(i) Electrical: one wire that is grounded when the air hose (glad hand) is physically connected.
(ii) Electrical/Mechanical: two wires that are connected together through a microswitch mounted within the glad hand bracket (or one wire grounded to the bracket and the switch output wire going to the tracking unit).
(iii) Physical/pressure: install a low cost pressure sensor (within the trailer portion) with an electrical switch output. This pressure sensor is placed inline with the air brake line in the trailer. Application of air pressure will close the pressure switch: grounding a wire and sending a tethered event.
(iv) Optical: install an optical sensor under the glad hand bracket that detects an air hose physically connected.
(v) Electromagnetic: install a hall-effect sensor to measure a change in magnetic flux to detect an air hose physically connected.
(vi) Electrical: design a glad hand bracket that contains two wiping contact areas (or fingers) that are electrically insulated from each other. These two areas or fingers would be electrically connected to each other when the air hose was physically connected.
(vii) Electrical: similar to (i) above, but in addition to measuring a ground signal, the sensing circuit would periodically generate a very low energy, high voltage signal. This high voltage would be applied to the insulated glad hand bracket 34. If the high voltage was allowed to be reached (and not arched over to ground), then the processor would interpret this as an untethered condition. A corroded bracket presents a very high electrical resistance, but a high voltage would find a path to ground through even high levels of corrosion, enabling the processor to determine the tethered/untethered status even with these high levels of corrosion. The high voltage levels should be generated periodically to keep the power consumption at a minimum since the sensor must operate under backup battery power for possibly long periods of time. It is also understood that the insulators 36 and 46, would be able to support the high voltage levels without it breaking down itself. The high voltage levels generated by this alternate embodiment would not contain enough energy to cause a human any harm in case he inadvertently touched the sensor while it was generating the high voltage.

Figure 11:
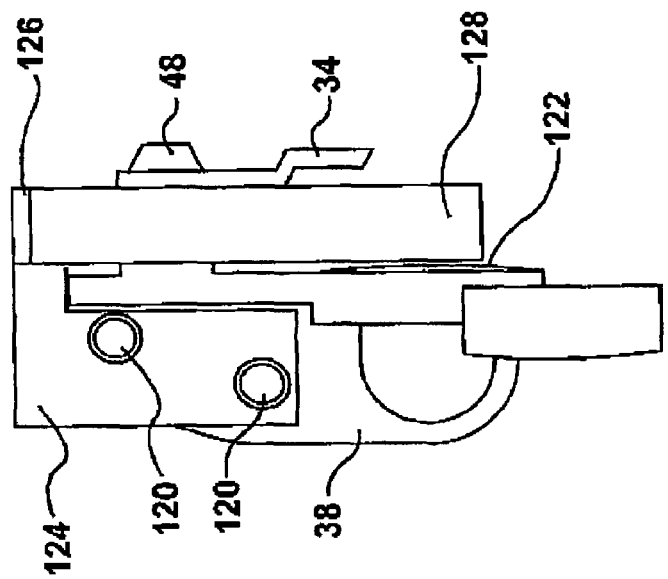
FIG. 11 is a side view of another embodiment of a glad hand pneumatic coupler, with an actuator arm in a closed position.
Figure 12:
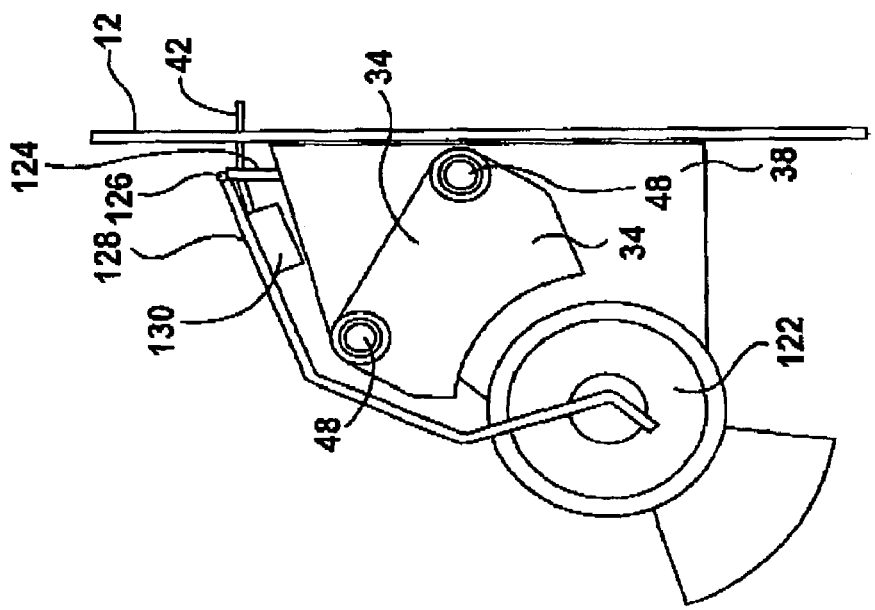
FIG. 12 is a top view of FIG. 11.
Figure 13:
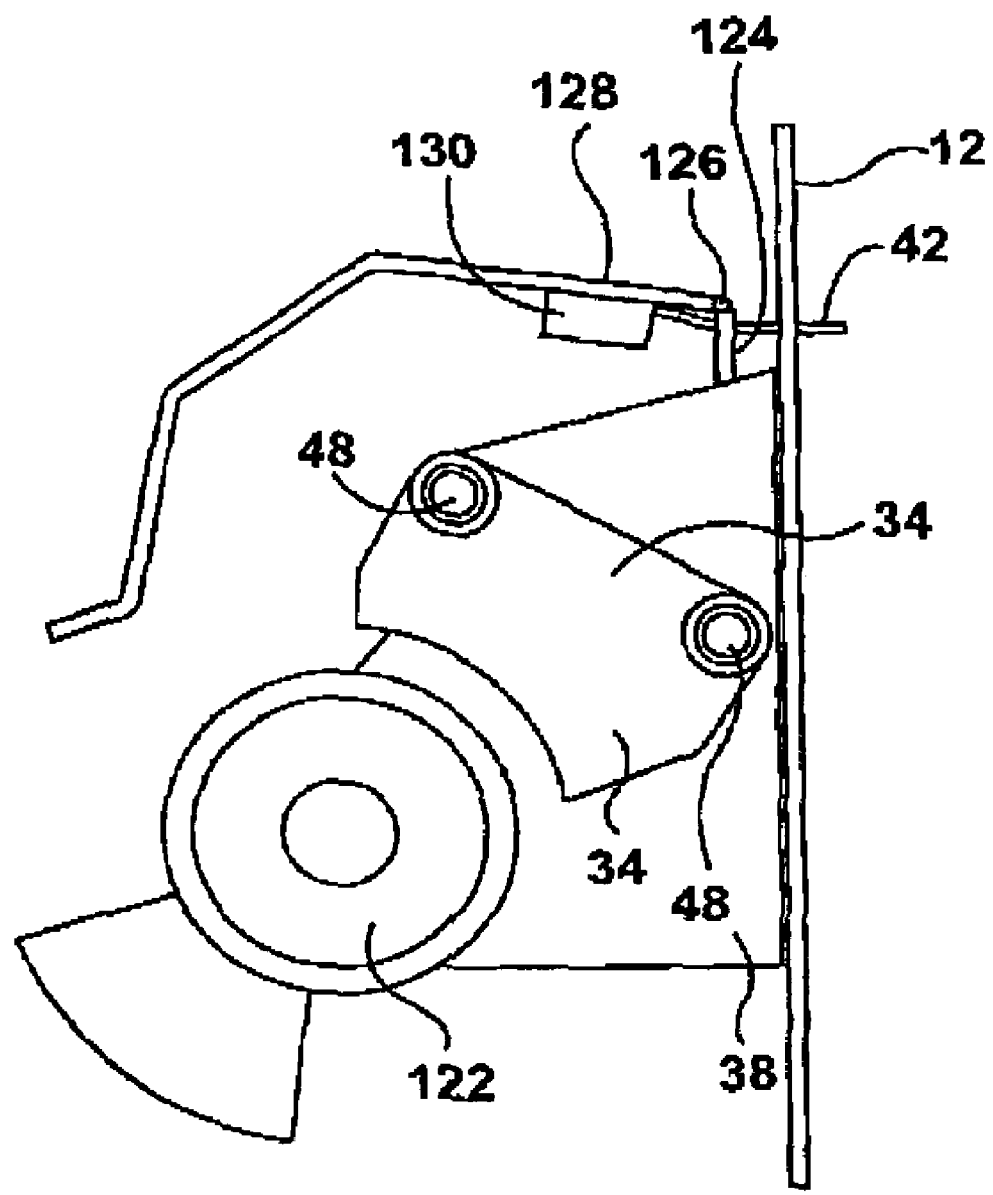
FIG. 13 is a side view of FIG. 11 with the actuator arm in an open position.

Another embodiment of the invention relating to the glad hand or tether sensor device is illustrated in FIGS. 11, 12 and 13. In this case a mounting bracket 124 includes two mounting holes which align with the existing mounting bolts 120 referred to earlier. The bracket 124 also includes an actuator arm or shield 128 which pivots or rotates about a spring-loaded hinge 126 as shown. The spring-loaded hinge 126 applies tension in such a way as to cause the actuator arm 128 to rest in a position interfering with the air inlet 122. In other words, the actuator arm 128 is biased in a closed position whereby the spring-loaded hinge 126 applies tension in such a way as to cause the actuator arm to bar access to the air inlet 122 and the ability to connect a tractor glad hand coupler 32. In this position the trailer 12 is untethered.

In order to allow the operator to connect the tractor glad hand coupler 32, the operator must first displace or rotate the actuator arm 128 up out of the way as shown in FIG. 13 to allow clear access to the mating air inlet 122, in the open position.

The arm has associated with it a tilt switch sensor 130. When the actuator arm 128 is rotated to the open position, the trailer glad hand can be coupled thereto. In this tethered position the tilt switch sensor 130 detects the position and causes a ground signal to be generated and transmitted to a sensor wire 42 and routed to the asset tracking device 14 through the front wall of the trailer 12 as previously described.

Accordingly the embodiment described above comprises two wires that are connected together through a tilt switch/sensor mounted on a hinged bracket which itself is mounted to the glad hand bracket.

It will be appreciated by those skilled in the art that other variations of the preferred embodiment may also be practised without departing from the scope of the invention.

What is claimed is:

1. A tether sensor device for monitoring connection status between a first vehicle portion and a second vehicle portion, the tether sensor device comprising:
   (a) a first coupler linked to the first vehicle portion;
   (b) a second coupler linked to the second vehicle portion; and
   wherein in a connected position the second coupler is attached to the first coupler to provide an air line for operation of a braking mechanism for the second vehicle portion; and
   wherein in the connected position the couplers provide an electrically conductive connection.

2. A tether sensor as claimed in claim 1 wherein a bracket is affixed to the second coupler but electrically insulated therefrom, and wherein in the connected position the couplers provide an electrically conductive connection between the bracket and the second coupler.

3. The tether sensor device of claim 2 wherein a sensor wire is connected to the bracket, the sensor wire is operable to provide a status reading that indicates whether tether sensor device is in the connected position.

4. A tether sensor as claimed in claim 1 wherein one of said couplers include a displaceable arm having a tilt switch, providing an electrical conductive connection in a first position and disconnecting the electrical connection in a second position.

5. A tether sensor as claimed in claim 4 wherein said displaceable arm comprises an actuation arm pivotally connected to the second coupler.

6. A tether sensor as claimed in claim 5 wherein the displaceable arm includes a spring-loaded hinge to bias said displaceable arm in a closed position.

7. A tether sensor device of claim 6 wherein a sensor wire is connected to the tilt switch.

8. A system for monitoring connection status between a first vehicle portion and a second vehicle portion, the system comprising the tether sensor device of claim 3 or 7 linked to a processor, the processor operable to monitor the sensor wire for the status reading.

9. The system of claim 8 wherein the processor communicates with a server, the processor reporting to the server the status reading.

10. The system of claim 9 wherein the processor communicates with a clock, the processor reporting to the server information in association with the status reading.

11. The system of claim 9 wherein the processor communicates with a location determining device, the processor reporting to the server geographical information in association with the status reading.

12. The system of claim 11 wherein the processor comprises a supervisory processor and a main processor, the supervisory processor connected to the sensor wire and operable to detect a change in the status reading.

13. The system of claim 12 wherein the main processor is biased to a sleep-mode, and wherein upon the supervisory processor detects a change in the status reading, the main processor operates in a non-sleep-mode for a pre-determined amount of time.

14. The system of claim 8 wherein one or more additional sensor wires are linked between the bracket and the processor, each additional sensor wire providing an additional status reading, the processor operable to monitor the one or more additional sensor wires and the additional status readings.

15. The system of claim 14 wherein the processor is operable to send an alarm signal to a server if the status readings are dissimilar.

16. A system for monitoring connection status between a first vehicle portion and a second vehicle portion, the system comprising two or more tether sensor devices as claimed in claim 2, each tether sensor device linked to a processor, the processor operable to monitor the sensor wires for the status readings.

17. A method for monitoring connection status between a first vehicle portion and a second vehicle portion, the method comprising:
  (a) linking a first coupler to the first vehicle portion and to an electrically conductive bracket;
  (b) linking a second coupler to the second vehicle portion and to a sensor wire;
  (c) affixing the bracket to the second coupler where the bracket electrically connects the sensor wire to an electrical signal in a first position and electrically disconnects the sensor wire from the electrical signal in a second position;
  (d) taking an electrical status reading of the sensor wire; and
  (e) monitoring the sensor wire for any change to the reading.

18. The method of claim 17 further comprising:
  (a) automating the monitoring of the sensor wire using a processor;
  (b) using the processor to wirelessly report the electrical status readings to a server.

19. The method of claim 17 wherein the bracket is insulated from the second coupler in the second position and electrically conductive in the first position.

20. The method of claim 17 wherein the bracket is rotatable to the first conductive position.

* * * * *